United States Patent Office 3,375,223
Patented Mar. 26, 1968

3,375,223
METHOD FOR POLYMERIZING
ORGANOPOLYSILOXANES
Duane F. Merrill, Ballston Spa, N.Y., assignor to General Electric Company, a corporation of New York
No Drawing. Filed Oct. 1, 1964, Ser. No. 400,934
6 Claims. (Cl. 260—46.5)

ABSTRACT OF THE DISCLOSURE

A method is provided for making organopolysiloxane resins utilizing a hydrogen chloride activated particulated siliceous material as a bodying catalyst. The resulting resin has been found to have improved shelf life stability and reduced cure time.

---

The present invention relates to a method for building up the molecular weight of organopolysiloxane resins. More particularly, the present invention relates to the employment of a hydrochloric acid activated particulated siliceous material to body organopolysiloxane resins.

Prior to the present invention, various methods were available for building up viscosities of organopolysiloxane resins in a controlled manner. The process of "bodying" is designed to increase the molecular weight of organopolysiloxane hydrolyzate to make it more valuable in resin applications; during bodying condensation of silanol radicals are effected in the hydrolyzate to lengthen shelf-life and decrease cure time of the resin. If bodying of the hydrolyzate is not accomplished in a controlled manner, premature gelation of the organopolysiloxane can occur.

One method that can be employed to increase the viscosity of organopolysiloxane hydrolyzate to shorten cure time of the resin after it is applied in a given application is shown by Britton et al. Patent 2,460,805. Britton et al. teach that organopolysiloxane polymers can be polymerized with acid activated clays such as bentonite, or other hydrous aluminum silicates. The clay is activated by heating it with either sulphuric acid or phosphoric acid to produce a cake-like mass which can be pulverized to a dry powder. As taught by R. N. Meals and F. M. Lewis, in "Silicones" (1959) by Rheinhold Publishing Corporation on page 134, organopolysiloxane resins also can be bodied by employing a metal soap catalyst such as zinc octoate.

Although the employment of either acid activated clay or metal soap can be utilized effectively for bodying a variety of organopolysiloxane resins, experience has shown that the employment of these materials often result in undesirable process conditions or undesirable properties in the final bodied product. For example, it has been found that when an organopolysiloxane resin is bodied with an acid activated clay in accordance with the teaching of the aforementioned Britton et al. patent, temperatures of at least 200° C. are required to achieve a desirable increase in resin viscosity. In addition, after the organopolysiloxane resin has been bodies with either acid activated clay or soap catalyst, the bodied resin often must be discarded unless it is utilized within three months or less. Gelation of the bodied resin also can occur within 24 hours unless the acid activated clay is carefully removed, such as by filtration. In addition, when conventional curing catalysts such as amines are employed in combination with the bodied resin, cure times often exceed 20 hours or more. Because of its solubility in the resin, removal of the metal soap catalyst from the bodied resin is not economically feasible. As a result, the bodied resin is contaminated with metal ions which can impair heat stability of the cured resin, as well as substantially reduce its shelf life.

The present invention is based on the discovery that if an organopolysiloxane hydrolyzate having the formula:

(1) 

where R is selected from a monovalent hydrocarbon radical and halogenated monovalent hydrocarbon radical, and $a$ has a value equal to from 1 to 1.8, inclusive, is heated in the presence of a hydrogen chloride activated particulated siliceous material, such as a diatomaceous earth, that the organopolysiloxane hydrolyzate can be bodied at a temperature that is substantially lower than that required by the use of a sulfuric acid or phosphoric acid activated bleaching earth. In addition, it has been found that organopolysiloxane hydrolyzate bodies with a hydrogen chloride activated particulated siliceous material possesses superior shelf life stability such as 6 months or more, without any evidence of change due to silanol condensation. The cure time of the resin is also dramatically reduced.

There is provided by the present invention, a method for bodying organopolysiloxane of Formula 1, which comprises (1) heating a mixture comprising said organopolysiloxane and a hydrogen chloride activated particulated siliceous material, and (2) recovering from (1), an organopolysiloxane having a molecular weight higher than said organopolysiloxane of (1).

Radicals included by R of Formula 1 are alkyl and chloroalkyl radicals, such as methyl, ethyl, chloroethyl, propyl, octyl, etc.; aryl and chloroaryl radicals, including phenyl, chlorophenyl, dichlorophenyl, diphenyl, naphthyl, tolyl, xylyl, etc. Where R in Formula 1 can represent more than one radical, these radicals can be all the same or any two or more of the aforementioned radicals.

The organopolysiloxane hydrolyzate that can be bodied in accordance with the practice of the invention, can be made by hydrolyzing organohalosilane having the formula:

2) 

where R is as defined above, $b$ is an integer equal to 1 or 2, and X is a halogen radical, such as chloro or bromo. Specific examples of the organohalosilanes included by Formula 2 are methyltrichlorosilane, dimethyldichlorosilane, methylphenyldichlorosilane, phenyltrichlorosilane, diphenyldichlorosilane, etc.

Mixtures of the above-mentioned organohalosilanes can be employed in the practice of the present invention to produce the desired organopolysiloxane resins. Hydrolysis of the mixture of halosilanes included by Formula 2 is described in Rochow, Chemistry of the Silicones (2nd edition), John Wiley and Sons, New York, on pages 90 thru 94. This hydrolysis procedure also includes hydrolysis of the organohalosilane of Formula 2 in the presence of aliphatic alcohols, hydrolysis involving the addition of water to organohalosilane of Formula 2, etc.

Particulated siliceous materials that can be employed in the practice of the invention include particulated material containing silicon dioxide or its hydrates. The particulated siliceous materials can be further characterized in that they are substantially free of chemically combined aluminum. Preferably, the particulated siliceous materials are heterogeneous solids having a high surface area, such as at least 0.02 m.²/g. and as high as 400 m.²/g.

The particulated siliceous materials can be activated by contact with hydrogen chloride, which can be utilized as hydrochloric acid. Contact between the particulated siliceous material and hydrogen chloride can be achieved in situ, or in the absence of the organopolysiloxane hydrolyzate. Preferably, the particulated siliceous material is treated with hydrochloric acid in the presence of the organopolysiloxane hydrolyzate. In situ treatment of the particulated siliceous material can be achieved with the employment of external hydrochloric acid, or by use of residual hydrogen chloride which may be present in the organopolysiloxane hydrolyzate. Diatomaceous earth is preferably utilized as the particulated siliceous material in the practice of the invention. Other materials that can be utilized, include, for example, fumed silica, silica aerogel, precipitated silica, etc.

In the practice of the invention, a mixture of the organopolysiloxane hydrolyzate, and hydrogen chloride activated particulated siliceous material is heated. The organopolysiloxane hydrolyzate is separated at a higher viscosity.

The order of addition of the various ingredients of the bodying mixture which can include a suitable organic solvent, is not critical. Preferably, the particulated siliceous material and hydrochloric acid is added to an organic solvent solution of the organopolysiloxane hydrolyzate.

The particulated siliceous material can be utilized in the bodying mixture at from 0.1% to 50% by weight of the organopolysiloxane hydrolyzate, and preferably from 0.5% to 20%. Experience has shown that a proportion of at least 1 part of hydrogen chloride per million parts of organopolysiloxane hydrolyzate will provide for effective results.

The mixture of organopolysiloxane hydrolyzate and the hydrogen chloride activated particulated material can be heated to a temperature between 50° C. to as high as 250° C. to effect a molecular weight increase in the organopolysiloxane hydrolyzate. A suitable organic solvent can be employed in the mixture to facilitate the polymerization and separation of the resulting bodied organopolysiloxane hydrolyzate. Suitable organic solvents include, for example, toluene, xylene, tetrahydrofuran, butyl acetate, butyl ether, trichloroethylene, etc. Experience has shown that effective bodying results can be achieved if a solution of the organopolysiloxane hydrolyzate is utilized having a concentration of at least 50% by weight of the solution of organopolysiloxane hydrolyzate. Preferably, a solution of organopolysiloxane hydrolyzate in organic solvent is employed having a concentration of 75% to 90% by weight of solution of the organopolysiloxane hydrolyzate.

Body time can vary between 2 hours or less to 12 hours or more depending upon the organopolysiloxane hydrolyzate, temperature, catalyst surface area, viscosity desired, etc. A convenient method for determining the point at which the organopolysiloxane hydrolyzate has reached a predetermined increase in viscosity is to employ a Zahn viscosimeter. The Zahn viscosimeter, as described in General Electric Review, No. 40, 35–6 (1937), can be employed to measure viscosity, by duration of flow. For example, if a No. 5 Zahn viscosimeter is employed, the flow time, at reflux temperatures, of a solution of unbodied organopolysiloxane hydrolyzate at 50% solids can vary between 3 seconds to 5 seconds. After the organopolysiloxane hydrolyzate has been bodied, its flow time, if measured at the same solids concentration and at the same temperature, can be increased by a factor of from 2 to 12 times. This can correspond to an increase in resin viscosity of the bodied organopolysiloxane as compared to the unbodied material, of a factor of from 2 to 60. At the desired viscosity, based on the flow time of an appropriate Zahn viscosimeter, the heating of the mixture can be terminated; it can be allowed to cool to room temperature. The concentration of solvent can be adjusted after the hydrogen chloride activated particulated siliceous material is removed. If desired, the particulated siliceous material can be left in the mixture, provided that it is allowed to cool to room temperature.

In order that those skilled in the art will be better able to practice the invention, the following examples are given by way of illustration and not by way of limitation. All parts are by weight.

*Example 1*

A methylphenylpolysiloxane hydrolyzate having a ratio of methyl and phenyl radicals to silicon of 1.3 to 1, is made by hydrolyzing a mixture of methyltrichlorosilane, phenyltrichlorosilane, and dimethyldichlorosilane in the presence of isopropanol. After the methylphenylpolysiloxane hydrolyzate is recovered from the hydrolysis mixture, it contains about 600 parts of residual HCl per million parts of methylphenylpolysiloxane hydrolyzate, as determined by titration with a standard potassium hydroxide solution.

Toluene is added to a mixture of 99 parts of the above methylphenylpolysiloxane and one part of diatomaceous earth, to form a solution having equal parts of toluene and mixture. A No. 5 Zahn viscosimeter shows that it takes about 3 seconds at 120° C. for the solution to completely flow through the orifice. The solution is heated for about 6 hours at 120° C. The flow time of the solution through a No. 5 Zahn viscosimeter is found to be 30 seconds at 120° C. The solution is stripped of toluene until its solids content is about 60%.

The above procedure is repeated, except sulfuric acid activated clay is substituted for diatomaceous earth. The sulfuric acid activated clay is prepared in accordance with Example 2 of Britton, Patent 2,460,805.

Unfiltered portions of methylphenylpolysiloxane solutions bodied with the diatomaceous earth and clay are allowed to stand at room temperature for several hours. Other portions of bodied methylphenylpolysiloxane solution are filtered and are placed in sealed containers; they are allowed to stand for several months at room temperature. Portions of the methylphenylpolysiloxane solutions bodied with the diatomaceous earth and clay also are tested for resin cure time at 200° C. utilizing an amine catalyst. Resin cure time is determined by casting a film from a solution of the methylphenylpolysiloxane and the curing catalyst. The films are heated to 200° C. The cure time is the time it takes to cure the film to a tensile of at least 1500 p.s.i.

The table below shows the results obtained with the respective methylphenylpolysiloxane with respect to shelf life stability and cure time. "Clay" shows the results obtained with the methylphenylpolysiloxane bodied with sulfuric acid activated clay; "Silica" shows the results obtained with the hydrogen chloride activated silica bodied in accordance with the practice of the invention. "Unfiltered" refers to the stability of the methylphenylpolysiloxane in solution at 25° C. in the presence of either the clay or silica.

TABLE I

| | Unfiltered (25° C.) | Shelf Life (25° C.) | | Cure Time (250° C.) |
|---|---|---|---|---|
| | | 3 Mos. | 6 Mos. | |
| Silica | Unchanged after 6 mos. | Unchanged | Unchanged | 20 Hours. |
| Clay | Gelled in 3 hours. | Gelled | | 4 Hours. |

*Example 2*

An 80% toluene solution of a methylphenylpolysiloxane hydrolyzate having a ratio of 1.4 to 1, methyl and phenyl radicals per silicon atom, is mixed with concentrated hydrochloric acid and 1% by weight of methylphenylpolysiloxane of diatomaceous earth. Sufficient concentrated hydrochloric acid is utilized to provide for a bodying mixture having about 0.25 part concentrated hydrochloric acid per part of the methylphenylpolysiloxane. The mixture is found to have an initial flow time through a No. 5 Zahn viscosimeter of about 5 seconds at 165° C. It is heated for two hours at a temperature of 165° C. Its flow time on the No. 5 Zahn viscosimeter is found to be about 20 seconds at 165° C. The mixture is filtered. A portion of the mixture is allowed to rest undisturbed at room temperature for several months in a sealed container.

The same procedure is repeated except zinc octoate is substituted for the diatomaceous earth and hydrochloric acid; there is utilized 0.5% by weight of zinc octoate based on the weight of methylphenylpolysiloxane. The initial flow time of the mixture through a No. 5 Zahn cup is found to be about the same as the flow time of the unbodied mixture containing diatomaceous earth as described above. After 6 hours of heating at 165° C., the flow time of the mixture is about equivalent to the above-described toluene solution of methylphenylpolysiloxane bodied with diatomaceous earth.

The shelf life stability of the methylphenylpolysiloxane bodied in accordance with the present invention "Silica," as compared to the shelf life of the resin bodied by the method of the prior art "Zinc Octoate," is shown in Table II below.

TABLE II

| | Shelf Life (25° C.) | |
|---|---|---|
| | 3 Mos. | 6 Mos. |
| Silica | Unchanged | Unchanged. |
| Zinc Octoate | do | Gelled. |

*Example 3*

A methylphenylpolysiloxane hydrolyzate having a ratio of 1.7 methyl and phenyl radicals per silicon atom is prepared by hydrolyzing methyltrichlorosilane, phenyltrichlorosilane, dimethyldichlorosilane and diphenyldichlorosilane. The methylphenylpolysiloxane hydrolyzate is adjusted to a 90% by weight of solids in toluene after it is recovered from the hydrolysis mixture. Fumed silica and concentrated hydrochloric acid are added to the toluene solution to provide for the production of a mixture having 2% by weight of fumed silica, and 20% by weight of concentrated hydrochloric acid based on the weight of methylphenylpolysiloxane hydrolyzate. The mixture requires 7 seconds to flow through a No. 5 Zahn viscosimeter when measured at 175° C. The mixture is heated four hours at 175° C. until the flow time through the No. 5 Zahn viscosimeter increases to 25 seconds as measured at 175° C. The fumed silica is filtered from the methylphenylpolysiloxane and the mixture is adjusted to 50% solids in toluene. A 50% solution of the bodied methylphenylpolysiloxane is found to remain unchanged after standing for 6 months at 25°C. in a sealed container.

Based on the results shown in the above tables and examples, those skilled in the art would know that the present invention provides for an improved method of bodying organopolysiloxane hydrolyzate having a ratio of from 1 to 1.8 organo radicals per silicon atom which is superior to the methods of the prior art. For example, resins bodied in accordance with the present invention as shown by Tables I and II, exhibit superior shelf life stability and cure time as compared to the same resins bodied by acid activated bleaching earth or a metallic soap. In addition, the resins bodied in accordance with the practice of the invention do not have to be immediately filtered of bodying catalyst which is required when using an acid activated clay, as shown in Table I.

A further advantage of the organopolysiloxane hydrolyzates bodied in accordance with the practice of the invention is that the cured product has superior heat stability as compared to cured products which have been bodied with metal soaps. Experience has also shown that unlike the practice of the present invention, bodying mixtures containing acid activated clay have to be immediately cooled to arrest further bodying.

It is to be understood, that the method of the present invention as exemplified by the above examples can be further illustrated by a much wider variety of organopolysiloxane hydrolyzates shown by Formula 1, along with various other particulated silica fillers as described above which can be activated with hydrogen chloride.

What I claim as new and desire to secure by Letters Patent of the United States is:

1. A method for effecting the controlled condensation of silanol radicals in a silanol-containing organopolysiloxane, which comprises (1) heating at a temperature between 50° C. and 250° C., a mixture comprising said silanol-containing organopolysiloxane and a hydrogen chloride activated particulated siliceous material selected from the class consisting of diatomaceous earth and fumed silica, which is present in said mixture at from 0.5% to 20% by weight of said silanol-containing organopolysiloxane, and (2) recovering an organopolysiloxane from the resulting mixture of (1), having a viscosity higher than said silanol-containing organopolysiloxane which has an average ratio of from 1 to 1.8 organo radicals per silicon atom, selected from the class consisting of monovalent hydrocarbon radicals, and halogenated monovalent hydrocarbon radicals.

2. A method in accordance with claim 1 in which said mixture of (1) is an organic solvent solution comprising a major amount by weight of said organopolysiloxane hydrolyzate.

3. A method in accordance with claim 1 in which said organopolysiloxane hydrolyzate is a methylphenylpolysiloxane.

4. A method in accordance with claim 1 in which said particulated siliceous material is diatomaceous earth.

5. A method which comprises (1) heating at a temperature between 50° C. and 250° C. an organic solvent solution comprising (A) a major amount by weight of a methylphenylpolysiloxane composed of chemically combined methylsiloxy units, phenylsiloxy units, dimethylsiloxy units and diphenylsiloxy units, in amounts sufficient to provide for an average ratio of about 1.7 methyl and phenyl radicals per silicon atom, and (B) from 0.5 to 20% by weight of said methylphenylpolysiloxane of a hydrogen chloride activated diatomaceous earth, and (2) recovering a methylphenylpolysiloxane from the resulting mixture of (1), having a viscosity higher than said methylphenylpolysiloxane of (1).

6. A method which comprises (1) heating at a temperature between 50° C. and 250° C. an organic solvent solution comprising (A) a major amount by weight of a methylphenylpolysiloxane composed of chemically combined methylsiloxy units, phenylsiloxy units, and dimethylsiloxy units in amounts sufficient to provide for an average ratio of about 1.3 methyl and phenyl radicals per silicon atom, and (B) from 0.5 to 20% by weight of said methylphenylpolysiloxane of a hydrogen chloride activated diatomaceous earth, and (2) recovering a methylphenylpolysiloxane from the resulting mixture of (1), having a viscosity higher than said methylphenylpolysiloxane of (1).

References Cited

UNITED STATES PATENTS

| 2,466,805 | 2/1949 | Britton et al. | 260—46.5 |
| 2,676,182 | 4/1954 | Daudt et al. | 260—46.5 |
| 2,793,198 | 5/1957 | Bluestein | 260—465 |
| 3,015,645 | 2/1962 | Tyler | 260—37 |
| 3,122,520 | 2/1964 | Lentz | 260—46.5 |

DONALD E. CZAJA, *Primary Examiner.*

JAMES A. SEIDLECK, *Examiner.*

M. I. MARQUIS, *Assistant Examiner.*